United States Patent [19]

Louch

[11] 3,895,124

[45] July 15, 1975

[54] PROCESS FOR CONTROLLING THE COERCIVITY OF A COBALT OR COBALT/NICKEL COATING APPLIED BY AN ELECTROLESS PLATING PROCESS

[75] Inventor: Robert William Louch, Welwyn, England

[73] Assignee: Imperial Chemical Industries Limited, London, England

[22] Filed: Dec. 11, 1972

[21] Appl. No.: 313,633

[30] Foreign Application Priority Data

Dec. 22, 1971 United Kingdom............... 59592/71

[52] U.S. Cl......................................... 427/8; 427/10

[51] Int. Cl............................................. H01f 10/00

[58] Field of Search............................ 117/235–240, 117/217

[56] References Cited

UNITED STATES PATENTS 3,245,826 4/1966 Luce et al........................... 117/236

3,269,854 8/1966 Hei................................. 117/240 X 3,523,823 8/1970 Keflas................................. 117/240

3,549,417 12/1970 Judge et al.......................... 117/240

FOREIGN PATENTS OR APPLICATIONS 998,130 7/1965 United Kingdom

*Primary Examiner*—William D. Martin

*Assistant Examiner*—Bernard D. Pianalto

*Attorney, Agent, or Firm*—Cushman, Darby & Cushman

[57] ABSTRACT

The coercivity of a cobalt electrolessly plated substrate is controlled by applying a very thin coating of nickel by an electroless plating process prior to cobalt plating and monitoring the coercivity of the coated article to vary the time of immersion in the nickel bath.

11 Claims, 1 Drawing Figure

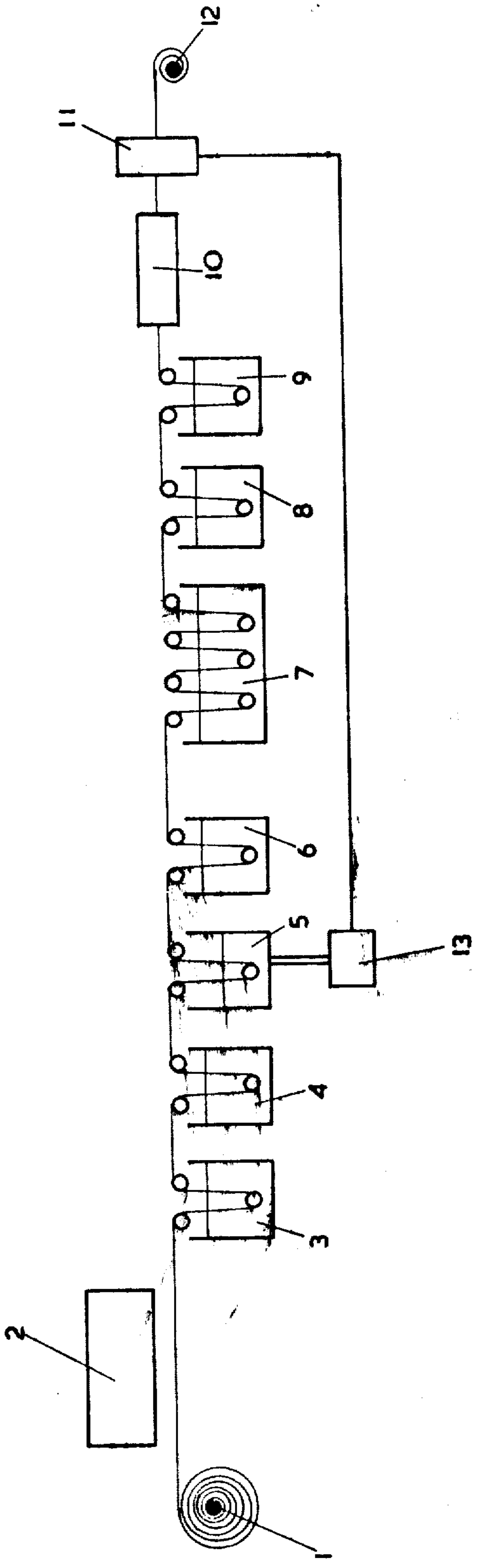
1
2
3
4
5
6
7
8
9
10
11
12
13

PROCESS FOR CONTROLLING THE COERCIVITY OF A COBALT OR COBALT/NICKEL COATING APPLIED BY AN ELECTROLESS PLATING PROCESS

The present invention relates to a plating process and in particular to an improved method of applying cobalt coatings to articles by an electroless plating process.

Cobalt platings are of increasing interest as magnetic coatings for use as magnetic information carriers. For example film materials having cobalt coatings are of use as magnetic recording tapes.

For magnetic applications, the coercivity of the coating is an important property. If it is too high magnetic recording heads may not be able to switch the magnetic polarisation, while if it is too low it may not be possible to attain the desired recording information density. The size of the cobalt particles in the plating has a marked effect on the coercivity of the coating. Where the particles are very small the coating has a high coercivity (of the order of hundreds of Oersteds) because each magnetic domain embraces a large number of particle boundaries. If the particle size is increased so that each magnetic domain is of similar size to or smaller than the cobalt particle, then the coercivity will be low (of the order of a few Oersteds or even fractions of an Oersted). The present invention is concerned with the small particle size coatings. It is possible to vary the coercivity of the cobalt coating by varying the cobalt thickness; the thicker the coating, the lower the coercivity. Thus in general, increasing the plating bath concentration, temperature, or pH, or the proportion or reducing agent or the plating time, all lead to an increase in the amount of cobalt deposited, and hence the thickness. In order to obtain a desired coercivity, the plating time is often undesirably long. Furthermore, for some applications there is a limit to the cobalt thickness that can be applied and yet a lower coercivity is required. Thus, for magnetic recording applications the cobalt thickness is preferably in the range 0.1 to 0.5 $\mu$m thick. If the coating is thinner than 0.1 $\mu$m the output signal is generally of insufficient strength, while if coatings thicker than 0.5 $\mu$m are used, there tends to be blurring between adjacent signals and also the product has undesirable demagnetisation properties. The preferred cobalt thickness is of the order of 0.4 $\mu$m.

In addition to reducing the coercivity without markedly altering the cobalt thickness, it would also be desirable to provide a method of monitoring and controlling the coercivity of the coating in line with its production.

It has been proposed in British Pat. No. 998,130 to apply a nickel coating to a substrate before cobalt plating in order to provide nuclei for the bonding of the cobalt layer to the substrate.

We have now found that the application of very thin coatings of nickel to the substrate before coating with cobalt has a profound effect on the coercivity of the coating; the nickel coating causing a marked reduction in the coercivity of the coating. In the present invention, we make use of this finding to provide a method of controlling the coercivity of the plated article.

We therefore provide a process for controlling the coercivity of a cobalt or cobalt/nickel coating applied by an electroless plating process to a non-magnetic substrate wherein the substrate is continuously passed through an electroless cobalt or cobalt/nickel plating bath characterised in that before the substrate is passed into the electroless cobalt or cobalt/nickel plating bath it is continuously passed through a nickel electroless plating both wherein a nickel plating of from 0.05 g $m^{-2}$ to 1.5 g $m^{-2}$ is applied to the substrate and the cobalt or cobalt/nickel plated substrate is continuously passed through means wherein the changes in the coercivity of the cobalt or cobalt/nickel plated substrate are detected and transmit a signal which is used to control the time of immersion of the substrate in the nickel bath whereby the coercivity of the cobalt or cobalt/nickel plated substrate is maintained substantially constant.

The amount of nickel applied is generally less than that necessary to give a continuous coating on the substrate: continuous coatings are obtained when using more than 1.5 g $m^{-2}$ of nickel. If less than 0.05 g $m^{-2}$ of nickel is applied to the substrate there is no significant effect on the coercivity of the cobalt plating while if more than 1.5 g $m^{-2}$ of nickel is applied, no further decrease in the coercivity of the cobalt plating is obtained as more nickel is applied. For digital recording applications, the amount of nickel deposited is preferably in the range 0.1 to 0.5 g $m^{-2}$ which gives, for a subsequent cobalt plating of thickness 0.4 $\mu$m, a coercivity of the order of 1,000 to 500 Oersteds. For analogue recording applications, particularly where it is desired that the recording medium is compatible with equipment designed for use with conventional magnetic oxide coatings, the amount of nickel deposited is preferably in the range 0.5 to 1.5 g $m^{-2}$ which gives, for a subsequent cobalt plating of thickness 0.4 $\mu$m, a coercivity of the order to 500 to 350 Oersteds. The amount of nickel applied may be determined by wet oxidising a measured area of the plated substrate with a mixture of nitric acid and sulphuric acid. After dilution of this solution to a known volume, the weight of nickel in the original sample is determined by atomic absorption spectroscopy.

Since the deposition of the nickel "sub coat" lowers the coercivity of the resultant cobalt coated article, by controlling the amount of nickel deposited, the coercivity of the article can be controlled. The amount of nickel required is small and so the time to deposit the nickel is much less than the time to achieve the desired cobalt thickness. Consequently by controlling the time of immersion in the nickel plating bath, the amount of nickel deposited and hence the coercivity of the cobalt plated article can be controlled.

The nickel plating is applied by immersion of the substrate in a nickel electroless plating bath composed of a solution of a nickel salt, a reducing agent and a complexing agent. A typical recipe is described hereinafter (designated Recipe 1), and, using this recipe, the immersion time necessary to obtained the desired nickel coating will generally be within the range 0.5 secs to 180 secs at a temperature of 20° to 90°C. The longer the time of immersion and the higher the temperature, the greater will be the amount of nickel deposited. Thus at the lower bath temperatures, the plating time necessary to obtain the desired amount of nickel will be at the upper end of the range, and vice-versa. It will be appreciated that other nickel electroless plating baths comprising other nickel salts and/or other reducing agents and/or complexing agents may be used, the time of immersion and plating temperature necessary to give a desired coating weight of course varying depending on the nature and concentration of the nickel plating bath components.

The cobalt plating bath comprises a solution of a cobalt salt, a reducing agent and a complexing agent. Any convenient nickel and cobalt salts such as nickel ammonium sulphate and cobalt sulphate may be employed.

In such plating solutions it is important that the reducing power of the reducing agent and the complexing power of the complexing ligands should be substantially balanced. The solution should preferably contain an excess of complexing agent over the nickel or cobalt ion and also and adequate amount of reducing agent to reduce the nickel or cobalt salt.

Reducing agents such as sodium hypophosphite, formaldehyde, and hydrazine are useful; sodium hypophosphite being particularly preferred.

As complexing agents a mixture of sodium tartrate or citrate and ammonium sulphate may be used. Preferably, in order to obtain a faster plating rate at low temperatures, the coating baths also contain borate ions. These may be obtained by adding boric acid to the recipe.

The following solution recipes are useful, the amounts specified being measured in gram moles:

Recipe 1 — nickel plating solution 0.08 nickel ammonium sulphate [$NiSO_4(NH_4)_2SO_4.6H_2O$]
0.4 sodium hypophosphite [$NaH_2PO_2$]
0.24 sodium tartrate [$(CHOH.COONa)_2.2H_2O$]
0.3 ammonium sulphate [$(NH_4)_2SO_4$]
0.96 boric acid [$H_3BO_3$]
Water to make 1 litre of solution
Sodium hydroxide to adjust pH to 9.0

Recipe 2 — cobalt plating solution 0.08 cobalt sulphate [$CoSO_4.7H_2O$]
0.2 sodium hypophosphite [$NaH_2PO_2$]
0.5 sodium tartrate [$(CHOH.COONa)_2 2H_2O$]
0.6 ammonium sulphate [$(NH_4)_2SO_4$]
0.5 boric acid [$H_3BO_3$]
Water to make 1 litre of solution
Sodium hydroxide to adjust pH to 9.5

Recipe 3 — cobalt plating solution 0.08 cobalt sulphate [$CoSO_4.7H_2O$]
0.3 sodium hypophosphite [$NaH_2PO_2$]
0.4 sodium tartrate [$(CHOH.COONa)_2 2H_2O$]
0.5 ammonium sulphate [$(NH_4)_2SO_4$]
0.9 boric acid [$H_3BO_3$]
Water to make 1 litre of solution
Sodium hydroxide to adjust pH to 9.5

Recipe 4 – cobalt plating solution 0.07 cobalt sulphate [$CoSO_4.7H_2O$]
0.2 sodium hypophosphite [$NaH_2PO_2$]
0.2 sodium citrate [$NaOOC.C(OH).(CH_2COONa)_2.2H_2O$]
0.6 ammonium sulphate [$(NH_4)_2SO_4$]
0.5 boric acid [$H_3BO_3$]
Water to make 1 litre of solution
Sodium hydroxide to adjust pH to 9.5

The solutions may be made by stirring the various components into water at room temperature.

It has been found that the cobalt plating solutions containing borate ions may be employed for the deposition of cobalt at temperatures such as 40°C and that the deposition rate, which is of the order of 2.5 μm per hour, is higher than that which can be obtained with normal solutions operating at similar temperatures. This increase in plating rate obtained using plating solution containing borate ions is also observed if the solutions are employed at higher temperatures, e.g. of the order of 80° to 90°C.

While, with such cobalt plating solutions, the time necessary to provide a desired coercivity variation of, for example, 400 Oersteds, may be several minutes in the plating bath, such a variation may be achieved with the present invention by altering the immersion in the nickel bath by only a few seconds.

In the present invention the coercivity of the cobalt coating applied by a continuous process is controlled by controlling the immersion time in the nickel electroless plating bath in response to a signal from a device monitoring the coercivity of the cobalt coating. It would not be practical to achieve such control in a process wherein the nickel plating step is omitted by varying the time of immersion in the cobalt plating bath because of the large variation in immersion time in the cobalt bath that would be necessary to obtain a substantial variation in the coercivity. Furthermore, a variation in the cobalt plating time will cause a variation in plating thickness which is undesirable as the remanence and hence output signal of the plating would vary.

The device monitoring the coercivity of the plated article may consist of an air-cored coil driven from the mains by a "Variac" autotransformer (Zenith Electric Co. Ltd.). By design of this coil, peak magnetic fields of greater than 1,000 Oersteds can be achieved in the centre of the coil, which is sufficient to switch the deposited magnetic coatings which are of interest.

The tape, after cobalt plating, is passed through a pick-up coil which is placed coaxially in the main coil. An identical second pick-up coil is provided adjacent to the first containing no magnetic sample. The voltage appearing across the first pick-up coil is proportional to the rate of charge of magnetic flux, B, passing through it. In general, both the air and the magnetic sample will contribute to B, but provide the former contribution, which is linearly related to the magnetic field is balanced out by the second pick-up coil, simple integration of the voltage will provide the required measure of the flux in the specimen. Both of these functions are performed with operational amplifiers (i.e. amplifiers designed to carry out mathematical operations) and the flux is plotted against magnetic field, which is proportional to the main coil current, on an oscilloscope display. The value of the coercivity displayed is continuously sampled and used, by means of suitable electronics, to control the time of immersion of the substrate in the nickel plating solution so as to keep the coercivity constant at a pre-set value. The time of immersion in the nickel plating bath is conveniently varied by varying the length of the substrate in the bath, e.g. by passing the substrate round rollers, the position of which and hence the length of substrate immersed, are varied, or by raising or lowering the nickel plating bath bodily, or by pumping nickel plating solution to or from the bath, hence altering the length of substrate immersed in accordance with the signal received from the coercivity monitoring device.

Where the substrate consists of discrete articles e.g. aluminum discs, these may be plated in accordance with the invention by transporting them through the plating baths on conveyors, variation of the plating time in the nickel bath being achieved by altering the speed of the conveyor passing through the nickel bath or by altering the length of conveyor immersed in the bath.

The process of the present invention is particularly suited to plating non-ferromagnetic materials such as aluminum or plastics materials. Examples of suitable plastics materials include acrylonitrile, butadiene, styrene copolymers (ABS); cellulose acetate; cellulose nitrate; ethyl cellulose, regenerated cellulose; methyl cellulose; polyamides; polymethyl methacrylate; polytrifluorochloroethylene; polytetrafluoroethylene; polymers or copolymers of α-olefins, such as ethylene, propylene and 4-methyl pentene-1; polymers and copolymers of vinyl chloride; polyvinylidene chloride; polycarbonates; polyimides; polysulphones; and linear polyesters such as polyethylene terephthalate and polyethylene-1:2-diphenoxyethane-4:4′-dicarboxylate.

When plating a metallic substrate, the substrate should be etched, e.g. with sodium hydroxide if the substrate is aluminium, and then activated by immersion in a solution of a noble metal (Pt, Ru, Rh, Pd, Os, Ir, Ag or Au), before plating. Plating of aluminium is of use in the production of magnetic storage discs, e.g. for computer systems.

When plating the surface of a plastics material, the surface should be sensitized prior to electroless plating by immersion in a solution such as stannous chloride followed by activation in a solution of a noble metal. It is convenient to pretreat the surface of the plastics material so as to improve the adhesion to the sensitizing material. For instance the surface may be subjected to a physical or chemical treatment, e.g. by a treatment with etching or solvent agents such as chromic acid in sulphuric acid, hot nitric acid, potassium permanganate and orthochlorophenol; exposing the surface to ozone; exposing the surface to flame treatment; and exposing the surface to ionising radiation such as that commonly known as corona discharge treatment. Alternatively or in addition the surface may be provided with an anchor coat comprising a material such as a thermoplastic copolymer to improve the adhesion.

Our copending British Application 16006/71, filed May 20, 1971, discloses a process of producing a magnetic information carrier. The process of the present invention may be employed for the production of the magnetic information carriers disclosed in our aforesaid copending application. For example an information carrier may be made from a film of polyethylene terephthalate coated with gelatin or a vinylidene chloride/acrylonitrile copolymer anchor coat by applying a further coat comprising an active component such as that disclosed in our aforesaid copending application, e.g. N,N′-di-cyanophenyl-4,4′-bipyridilium-dichloride, in a solution of polyvinyl alcohol. The coated film is exposed to a negative image such as a lined image with ultraviolet light or an electron beam and then activated in an activator solution, preferably a palladium chloride solution. Finally the film is plated with nickel and then cobalt according to the invention.

As well as applying a cobalt plating to the nickel plated substrate, the present invention is also of use in applying a plating of a mixture of cobalt with other ferromagnetic materials. For example a mixture of nickel and cobalt may be applied to the nickel plated substrate by incorporating a nickel salt such as nickel dichloride or nickel sulphate in the cobalt plating solution.

A typical coating line for operation of our preferred process is shown in diagrammatic form in the accompanying drawing.

A base film having a radiation sensitive coating thereon is fed from a reel 1, through an exposure zone 2 where it is exposed to UV radiation, to a series of tanks. The tanks are as follows:

Tank 3 — palladium chloride activator solution
Tank 4 (and also tanks 6, 8 and 9) — wash tanks of water
Tank 5 — nickel plating bath
Tank 7 — cobalt plating bath After leaving wash tank 9, the plated film is dried in zone 10 and passed through a coercivity monitor 11 to a wind up zone 12. A signal from the monitor 11 controls the operation of a pump 13 which feeds nickel plating solution to, or removes it from, tank 5, thus altering the length of film immersed in the nickel bath, in accordance with the signal.

The abrasion resistance of the coating may be increased by coating the plated substrate with a protective lacquer, for example a polyurethane lacquer.

Although, as described above, the invention is of particular use in applying magnetic coatings to substrates, the invention also provides a convenient method of producing bright metallic coatings of consistent thickness with, in some cases, improved adherence and abrasion resistance and so the present invention is also of use in applying cobalt coatings for non-magnetic applications, for example as a decorative finish.

The invention is further illustrated by the following Examples.

EXAMPLE 1

In this example a magnetic recording tape was prepared by the deposition of an alloy of cobalt and phosphorus on to a suitable substrate. The coercivity of the magnetic deposit was maintained at a constant value by the use of an electroless nickel precoat.

The substrate used was a tape slit from a balanced biaxially oriented and heat set polyethylene terephthalate film, 36 μm in thickness. The tape was processed in a continuous length.

The tape was first passed through a tank containing an aqueous solution of sodium hydroxide (25% by weight) and a non-ionic surface active agent sold as 'Lissapol' N (0.05% by weight) at 95°C. This solution etched the surface of the tape so that subsequent plating could take place. The dwell-time in the solution was 5 minutes. The tape was then washed by passing through a tank containing distilled water.

The etched surface of the tape was sensitized by passage through a tank containing a solution of stannous chloride in dilute hydrochloric acid. This sensitising solution was prepared by dissolving the following reagent grade materials in distilled water:

| | |
|---|---|
| Stannous chloride | 10 g $l^{-1}$ |
| Hydrochloric Acid (35% w/w) | 40 g $l^{-1}$ |

The dwell-time of the tape in this solution was 1½ minutes at 25°C. The surface was subsequently washed in distilled water.

The sensitized surface was passed through a bath containing an activator solution prepared by dissolving the following reagent grade materials in distilled water:

| | |
|---|---|
| Palladium chloride | 0.5 g $l^{-1}$ |
| Hydrochloric acid (35% w/w) | 10 g $l^{-1}$ |

The dwell-time of the tape in this solution was 1 minute at 25°C. The surface was subsequently washed in distilled water.

A thin coating of nickel was deposited on the activated surface by passing the tape through a solution having the constitution:

0.08 g moles nickel ammonium sulphate [$NiSO_4.(NH_4)_2SO_4.6H_2O$]
0.4 g moles sodium hypophosphite [$NaH_2PO_2$]
0.24 g moles sodium tartrate [$(CHOH.COONa)_2.2H_2O$]
0.3 g moles ammonium sulphate [$(NH_4)_2SO_4$]
0.96 g moles boric acid [$H_3BO_3$]
Water to make 1 litre of solution
Sodium hydroxide to adjust pH to 9.0

The solution was maintained at 40°C. At the start of the experiment the dwell-time of the activated tape in this solution was 15 secs. This gave a nickel deposit of 0.15 g $m^{-2}$. The surface was subsequently thoroughly washed in distilled water.

The magnetic alloy of cobalt and phosphorus was next deposited. This was done by passing the tape through a solution prepared, using reagent grade chemicals, as follows:

0.08 g moles cobalt sulphate
0.3 g moles sodium hypophosphite
0.4 g moles sodium potassium tartrate
0.5 g moles ammonium sulphate
0.9 g moles boric acid
Water to make 1 litre of solution
Sodium hydroxide to adjust pH to 9.5

The solution was maintained at 40°C. The dwell-time of the tape in this solution was 10 minutes. The tape was subsequently washed in distilled water and dried in a circulating air oven at 80°C. A strongly adherent cobalt/phosphorus coating was found to have been deposited of thickness 0.4 μm. The coated tape was found to be capable of storing information by employing known inductive recording techniques for write-in and read-out. The coercivity of the deposited coating was 700 Oersteds.

The coercivity of the tape was continuously monitored and any change in this value due to the gradual exhaustion of the cobalt plating bath was compensated by raising or lowering the level of the solution in the nickel plating bath. This adjusted the dwell-time of the activated tape in the nickel plating bath and hence the amount of nickel deposited. By this means long lengths of tape with consistent values of coercivity were prepared. The plated tape is suitable for magnetic recording purposes for example as a magnetic recording tape. By way of comparison, when the nickel precoat was omitted, the cobalt/phosphorus plated tape had a coercivity of over 1,000 Oersteds and the coating was less strongly adherent to the substrate as judged by scratching the surface with a razor blade.

EXAMPLE 2

Example 1 was repeated except that the dwell-time of the palladium activated tape in the nickel plating bath at the start of the experiment was 10 seconds at 40°C which gave a nickel coating of 0.10 g $m^{-2}$. This dwell-time was adjusted to maintain consistent values of the coercivity required.

Again a strongly adherent cobalt/phosphorus coating was deposited which had a coercivity of 800 Oersteds. The tape was capable of storing information by employing inductive recording techniques for write-in and read-out. The tape is suitable for magnetic recording purposes such as magnetic recording tape.

EXAMPLE 3

Example 1 was repeated except that the dwell-time of the palladium activated tape in the nickel plating bath at the start of the experiment was 30 seconds at 40°C which gave a nickel coating of 0.80 g $m^{-2}$. This dwell-time was adjusted to maintain consistent values of the coercivity required.

Again a strongly adherent cobalt/phosphorus coating was deposited which had a coercivity of 500 Oersteds. The tape was capable of storing information by employing inductive recording techniques for write-in and read-out. The tape is suitable for magnetic recording purposes such as magnetic recording tape.

EXAMPLE 4

In this example a multi-filamentary recording pattern of deposited cobalt was applied to a thermoplastic film.

The support was a balanced biaxially oriented and heat set polyethylene terephthalate film coated with an anchor coat of thickness 1 μm comprising a copolymer of 88% by weight vinylidene chloride and 12% by weight acrylonitrile. To this was applied a coating of gelatin containing a minor proportion of formalin as cross-linking agent. The thickness of this sub-coating was approximately 0.1 μm.

A coating of an active component as specified in our copending U.K. Patent Application 16006/71 was applied over the sub-coat. The coating composition incorporated N,N-di-p-cyanophenyl-4,4'-bis-(pyridilium) dichloride as the active component and polyvinyl alcohol as a carrier matrix made up in water. Also contained in this coating formulation were glyoxal as a cross-linking agent for the polyvinyl alcohol and a non-ionic surface active agent sold as 'Lissapol' N to ensure that the solution spread evenly over the sub-coated film. The coating solution had the following constitution:

10 g polyvinyl alcohol (available commercially as Kuroshihi Poval 124)
1 g N,N-di-p-cyanophenyl-4,4'-bis-(pyridilium) dichloride
1.0 g glyoxal
0.05 g 'Lissapol' N
100 g water
pH 3.8 (adjusted with dilute sulphuric acid)

The coated film was dried slowly at room temperature (25°C) until touch-dry before finally curing for 5 minutes at 100°C. The thickness of this active component containing coating was about 0.2 μm.

The coated film was wound on a reel and then the coated film was treated, in accordance with the invention, using the form of apparatus described previously in relation to the drawing.

The film was exposed to ultra violet light using a 500 W medium pressure mercury arc lamp for 15 seconds through a lined negative image so as to sensitise the coating by exposure in tracks 50 μm wide spaced 50 μm apart and then passed through a bath of an activator solution maintained at 25°C to deposit a layer of palladium metal over the exposed parts of the coating.

The activator solution had the following constitution, in which parts are measured by weight:

0.1 part palladium chloride
10 parts 35% (w/w) hydrochloric acid
40 parts anhydrous sodium sulphate
4 parts borax
1,000 parts distilled water The dwell-time in the activator bath was 1 minute. From the activator bath the film was then thoroughly rinsed with distilled water and passed to a nickel plating bath having the constitution:

0.08 g moles nickel ammonium sulphate [$NiSO_4.(NH_4)_2SO_4.6H_2O$]
0.4 g moles sodium hypophosphite
0.24 g moles sodium tartrate
0.3 g moles ammonium sulphate
0.96 g moles boric acid
Water to make 1 litre of solution
Sodium hydroxide to adjust pH to 9.0

The solution was maintained at 40°C. At the start of the experiment the dwell-time of the activated film in this solution was 15 secs. This gave a thin nickel deposit of 0.15 g $m^{-2}$. The film was then thoroughly rinsed in distilled water.

The magnetic alloy of cobalt and phosphorus was next deposited. This was done by passing the tape through a solution prepared, using reagent grade chemicals, as follows:

0.08 g moles cobalt sulphate
0.3 g moles sodium hypophosphite
0.4 g moles sodium potassium tartrate
0.5 g moles ammonium sulphate
0.9 g moles boric acid
Water to make 1 litre of solution
Sodium hydroxide to adjust pH to 9.5

The solution was maintained at 40°C. The dwell-time of the film in this solution was 10 minutes, during which time a strongly adherent cobalt/phosphorus coating was deposited over the regions originally exposed to ultra violet light. The film was subsequently washed in distilled water and dried in a circulating air oven at 80°C. The thickness of the magnetic alloy coating was 0.4 μm and the coercivity was found to be 720 Oersteds. The coated film was found to be capable of storing information by employing known inductive recording techniques for write-in and read-out.

The coercivity of the film was continuously monitored and any change in this value due to the gradual exhaustion of the cobalt plating bath was compensated by raising or lowering the level of the solution in the nickel bath by pumping nickel plating solution to or from the bath. This adjusted the dwell-time of the activated film in the nickel plating bath and hence the amount of nickel deposited. By this means long lengths of tape with consistent values of coercivity were prepared. The plated film is suitable for magnetic recording purposes for example as magnetic recording tape.

EXAMPLE 5

Example 4 was repeated to deposit a multifilamentary pattern of a cobalt/phosphorus alloy on the surface of the film. The procedure of Example 4 was employed with the exception that the dwell-time of the film in the nickel pre-coating bath was 45 secs, the bath being maintained at 25°C. This gave a nickel coating of 0.17 g $m^{-2}$. This plating time was adjusted to maintain consistent values of the coercivity required.

Again a strongly adherent cobalt/phosphorus coating was deposited over the areas originally sensitised with ultra violet light which had a coercivity of 680 Oersteds. The film was capable of storing information by employing inductive recording techniques for write-in and read-out. The film was suitable for magnetic recording purposes such as magnetic recording tape.

EXAMPLE 6

In this example a decorative coating of cobalt is applied to the surface of the polypropylene.

The surface of the polypropylene was firstly etched with a chromic acid composition formed by dissolving chromium trioxide in sulphuric acid, water and phosphoric acid as disclosed in our British Pat. No. 1,259,838. Afterwards the surface was washed in distilled water.

The etched surface was sensitised by immersion in a solution of 10 g $l^{-1}$ stannous chloride and 40 g $l^{-1}$ 36% (w/w) hydrochloric acid for 1 minute. The surface was rinsed in distilled water.

The sensitised surface was immersed in an activator solution for 1 minute, comprising 1 g $l^{-1}$ palladium chloride and 10 g $l^{-1}$ 36% (w/w) hydrochloric acid. The activated surface was thoroughly rinsed in distilled water.

A thin sub-coating of nickel was deposited upon the activated surface of the sample by immersion at 25°C for 90 seconds in a solution having the constitution:

0.08 g moles nickel ammonium sulphate
0.4 g moles sodium hypophosphite
0.24 g moles sodium tartrate
0.3 g moles ammonium sulphate
0.96 g moles boric acid
Water to make 1 litre of solution
Sodium hydroxide to adjust pH to 9.0

The nickel sub-coated surface was rinsed in distilled water. A nickel coating of 1.47 g $m^{-2}$ was obtained.

A coating of cobalt phosphorus alloy was next deposited upon the surface by immersion at 60°C in a solution having the constitution:

0.08 g moles cobalt sulphate
0.3 g moles sodium hypophosphite
0.4 g moles sodium potassium tartrate
0.5 g moles ammonium sulphate
0.9 g moles boric acid
Water to make 1 litre of solution
Sodium hydroxide to adjust pH to 9.5

The plated sample was removed from the bath when sufficient metal had been deposited. The surface was washed with distilled water and was found to have a strongly adherent cobalt/phosphorus coating. The plating rate was about 10 μm per hour. Bright metallic coatings of cobalt/phosphorus alloy were prepared which possessed good abrasion resistance.

EXAMPLE 7

Example 6 was repeated to plate an acrylonitrile/-butadiene/styrene graft copolymer (ABS) with a coating of cobalt/phosphorus alloy.

The surface to be coated was etched with a solution comprising 50% sulphuric acid, 40% phosphoric acid, 1.5% chromic oxide and 5% water measured by weight. After etching for 5 minutes, the surface was thoroughly washed.

The surface was next sensitised and activated in stannous chloride solution and palladium chloride respectively as in Example 6.

A thin sub-coating of nickel was deposited on the activated surface by immersion at 40°C for 35 seconds in a nickel plating solution as described in Example 6. The weight of the nickel deposit was found to be 0.95 gm$^{-2}$.

A coating of cobalt was deposited from a solution of the following maintained at 70°C:

0.07 g moles cobalt sulphate
0.2 g moles sodium hypophosphite
0.2 g moles sodium citrate
0.6 g moles ammonium sulphate
0.5 g moles boric acid
Water to make 1 litre of solution
Sodium hydroxide to adjust pH to 9.5

It was found that a strongly adherent coating of cobalt/phosphorus allow was deposited on the surface of the ABS. The metal coating had a bright appearance and possessed good abrasion resistance.

EXAMPLE 8

In this example a magnetic recording disc was prepared by the deposition of an alloy of cobalt and phosphorus on to an aluminium alloy disc.

The disc was first placed in a solution of sodium hydroxide (5% by weight) in de-ionised water containing 0.05% by weight of non-ionic surface active agent sold as 'Lissapol' N maintained at 60°C. This served both to degrease and to etch the surface so as to provide a good key for subsequent plating. The etched disc was thoroughly washed in de-ionised water.

The etched surface of the disc was activated by immersion in a bath containing the following ingredients at room temperature for 2 minutes:

| | |
|---|---|
| palladium chloride | 0.5 g l$^{-1}$ |
| hydrochloric acid (35% w/w) | 10 ml l$^{-1}$ |

non-ionic surface active agent 'Lissapol' N 0.2 g l$^{-1}$ The surface was subsequently rinsed in distilled water.

A thin coating of nickel was deposited on the activated surface by immersion in an electroless nickel plating bath as previously described in Example 1. The solution was maintained at 40°C. The dwell-time was 20 secs which gave a nickel deposit of 0.5 gm$^{-2}$. The surface was thoroughly washed in distilled water.

The magnetic alloy of cobalt and phosphorus was next deposited. This was done by immersing the nickel plated disc in a solution as previously described in Example 1. The solution was maintained at 40°C. The dwell-time of the disc in the plating solution was 10 minutes. The disc was subsequently washed in distilled water and dried in a circulating air oven at 80°C. A strongly adherent cobalt/phosphorus alloy coating was found to have been deposited of thickness 0.4 $\mu$m. The plated disc was found to be capable of storing information by employing known inductive recording techniques for write-in and read-out. The coercivity of the deposited coating was 550 Oersteds.

The coercivity of subsequent discs plated with the same cobalt/phosphorus alloy from the same solution was monitored. Any change in this value was compensated due to the gradual exhaustion of the cobalt/phosphorus plating bath, by adjusting the time of immersion of the disc in the nickel plating bath and hence the amount of nickel deposited. By this means many discs may be prepared having consistent values of coercivity which are suitable for use as magnetic recording discs.

I claim:

1. A process for controlling the coercivity of a cobalt of cobalt/nickel coating applied by an electroless plating process to a non-magnetic substrate wherein the substrate is continuously passed through an electroless cobalt or cobalt/nickel plating which comprises:

a. first continuously passing the substrate through an electroless nickel bath wherein a nickel plating of from 0.05 to 1.5 g m$^{-2}$ is applied to the substrate;
b. continuously passing the nickel-plated substrate of (a) through an electroless cobalt or cobalt/nickel plating bath to provide a cobalt or cobalt/nickel plated substrate;
c. continuously measuring the changes in the coercivity of the cobalt or cobalt/nickel plated substrate of (b) in the form of a signal; and
d. transmitting the signal to (a) and using the signal to control (a) by varying the amount of nickel applied within the limit 0.05 to 1.5 g m$^{-2}$ whereby the coercivity of the product is maintained substantially constant.

2. A process as claimed in claim 1 wherein the amount of nickel deposited is in the range of 0.1 to 0.5 g m$^{-2}$.

3. A process as claimed in claim 1 wherein the amount of nickel deposited is in the range 0.5 to 1.5 g m$^{-2}$.

4. A process as claimed in claim 1 in which the cobalt, or cobalt/nickel, plating has a thickness of 0.1 to 0.5 $\mu$m.

5. A process as claimed in claim 1 wherein the substrate has been activated by immersion in a solution of a salt of a noble metal.

6. A process as claimed in claim 1 wherein the substrate is an activated tape of a plastic material.

7. A process as claimed in claim 6 wherein the plastics material is polyethylene terephthalate.

8. A process as claimed in claim 5 in which the substrate comprises a plurality of aluminium discs.

9. The process of claim 1 wherein the amount of nickel applied is controlled by controlling the time of immersion of the substrate in the nickel bath in (a).

10. A process as claimed in claim 9 wherein the time of immersion in the nickel plating bath is within the range 0.5 to 180 seconds.

11. A process as claimed in claim 9 wherein the time of immersion in the nickel plating bath is varied by altering the length of substrate immersed in the bath.

* * * * *